W. H. GALLUP.

Dress-Facings.

No. 5,492. Reissued July 15, 1873.

Inventor

Wm H. Gallup

Witnesses.

S. J. Gordon

John M. Ripley

AM. PHOTO-LITHOGRAPHIC CO. N.Y. (OSBORNE'S PROCESS.)

UNITED STATES PATENT OFFICE

WILLIAM H. GALLUP, OF TROY, NEW YORK.

IMPROVEMENT IN DRESS-FACINGS.

Specification forming part of Letters Patent No. 138,326, dated April 29, 1873; reissue No. 5,492, dated July 15, 1873; application filed June 24, 1873.

*To all whom it may concern:*

Be it known that I, WILLIAM H. GALLUP, of Troy, in the county of Rensselaer and State of New York, have invented a new and Improved Fabric for Facing, Stiffening, and Protecting Dress-Skirts, of which the following is a specification:

My invention consists of a new article of trimming for facing, stiffening, and protecting the bottoms of the skirts of ladies' dresses, which is composed of a strip of starched, gummed, or otherwise-stiffened muslin, of the character of wigan, say, four inches, more or less, wide, and of one or more plies or thicknesses, with a narrow border, say, about an inch wide, of the same or any equivalent material, further stiffened by fluting sewed on one edge, which I propose to manufacture in about twelve-yard pieces, and put up for market in the ordinary way of putting up goods of this class, to provide a better article for stiffening, facing, and protecting the skirt-bottoms than the ordinary facing used; also more ornamental, being so applied to the dress-skirts that the fluted part projects below the edge of the dress, to be exposed to view, and to support the dress above the ground.

By fluting I mean material plaited, folded, or doubled in any form, whereby material longer than the border may be attached thereto within its length.

Figure 1:
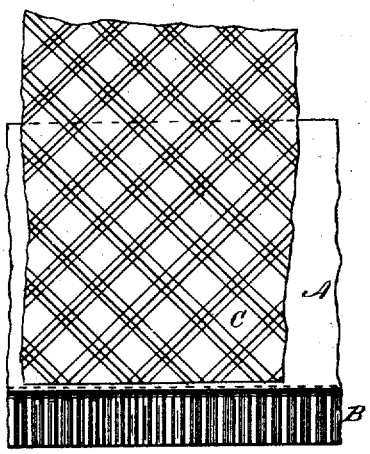
Figure 2:
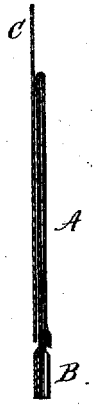

Figure 1 is a front elevation of a section of my improved trimming; also a section of a dress-skirt faced with the trimming; and Fig. 2 is a sectional elevation of Fig. 1.

Similar letters of reference indicate corresponding parts.

A is the plain strip of stiffened fabric, which I prefer to make double by taking a piece twice as wide as I want the plain part of the finished article to be, and folding it over, as shown in Fig. 2. B is the strip or border of fluted stuff, of the same kind or any equivalent thereof, which, being originally made stiff and firm with sizing, is greatly increased in stiffness by the fluting, so as to be capable of supporting the dress-skirt, and rendered very durable. This fluted strip I sew onto the piece A at one edge, as shown, placing it between the two parts, when the said piece A is composed of a double strip, and sewing them together, as shown. The edge of the fluted strip sewed onto the strip A is flattened down, by the pressure of the sewing-machine, so as to be sewed smoothly at the same time it is sewed on. C represents the skirt of the dress, to which this improved facing is sewed, so that the fluted border projects below the skirt.

I do not limit myself to the employment of a sized or stiffened fabric for the part B, because a strip of cloth without sizing will be stiffened sufficiently for some dresses by the fluting, and be less noisy.

Having thus described my invention, I claim as new and desire to secure by Letters Patent—

As a new article of manufacture, a skirt-protecting facing composed of a plain band of stiffened fabric and a fluted strip attached thereto, substantially as and for the purpose described.

WM. H. GALLUP.

Witnesses:

S. J. GORDON,

JOHN W. RIPLEY.